(12) United States Patent
Curtis et al.

(10) Patent No.: US 6,924,942 B2
(45) Date of Patent: Aug. 2, 2005

(54) HOLOGRAPHIC STORAGE LENSES

(75) Inventors: Kevin Curtis, Longmont, CO (US); Jan Hoogland, Dana Point, CA (US)

(73) Assignee: Inphase Technologies, Longmont, CO (US)

( * ) Notice: Subject to any disclaimer, the term of this patent is extended or adjusted under 35 U.S.C. 154(b) by 0 days.

(21) Appl. No.: 10/917,450

(22) Filed: Aug. 13, 2004

(65) Prior Publication Data

US 2005/0018316 A1  Jan. 27, 2005

Related U.S. Application Data

(62) Division of application No. 10/102,974, filed on Mar. 22, 2002, now Pat. No. 6,847,498.
(60) Provisional application No. 60/369,343, filed on Oct. 17, 2001.

(51) Int. Cl.[7] .......................... G02B 5/32; G02B 13/18; G03H 1/16
(52) U.S. Cl. .......................... 359/718; 359/708; 359/21; 359/29
(58) Field of Search .................... 359/718, 708, 359/728, 12, 21, 29, 30

(56) References Cited

U.S. PATENT DOCUMENTS

| 4,904,062 A | 2/1990 | Morishita et al. ........... 350/432 |
|---|---|---|
| 4,986,641 A | 1/1991 | Braat ........................... 350/432 |
| 5,311,364 A | 5/1994 | Kanoshima et al. ........ 359/756 |
| 5,535,058 A | 7/1996 | Tanaka et al. ............... 359/711 |
| 5,677,798 A | 10/1997 | Hirano et al. ................ 359/717 |
| 6,103,454 A | 8/2000 | Dhar et al. .................. 430/290 |
| 6,104,511 A | 8/2000 | Hesselink et al. ............ 359/22 |
| 6,252,686 B1 | 6/2001 | Ando ........................... 359/15 |
| 2004/0012703 A1 | 1/2004 | Ninomiya et al. .......... 348/335 |

FOREIGN PATENT DOCUMENTS

| JP | 2-16513 | 1/1990 | ................ 359/708 |
|---|---|---|---|
| JP | 2-153310 | 6/1990 | ................ 359/708 |

OTHER PUBLICATIONS

D.M. Petter et al., "The Photorefractive Effective," *Scientific American*, pp. 62–74, Oct. 1990.

L. Dhar, et al., "Photopolymers for Digital Holographic Data Storage", Holographic Data Storage, 199–207 (2000).

*Primary Examiner*—Timothy Thompson
(74) *Attorney, Agent, or Firm*—Morrison & Foerster LLP

(57) ABSTRACT

Disclosed are holographic storage systems and lenses for holographic storage systems. The lens units can be of a single-component design. The lenses can be used to both record to photorefractive storage media and to read from photorefractive storage media.

23 Claims, 14 Drawing Sheets

| LENS FIGURE NO. | PUPIL SEPARATION (DISTANCE FROM LENS UNIT TO PUPIL IN MM) | AXIAL THICKNESS OF LENS UNIT (IN MM) | PUPIL ABERRATION (% ON-AXIS PUPIL RADIUS) | OBJECT DISTANCE (DISTANCE FROM LENS UNIT TO FOCAL PLANE IN MM) | PUPIL LOCATION TO FOCAL PLANE (IN MM) | SUM OF OUTSIDE CURVATURES (CURVATURE OF FIRST OUTSIDE SURFACE + CURVATURE OF SECOND OUTSIDE SURFACE IN $MM^{-1}$) | DIFFERENCE BETWEEN OUTSIDE CURVATURES (CURVATURE OF FIRST SURFACE - CURVATURE OF SECOND SURFACE IN $MM^{-1}$) | PETZVAL SUM (IN $MM^{-1}$) |
|---|---|---|---|---|---|---|---|---|
| 2 | 42 | 81 | 10 | 148 | 271 | -.0219 | .00160 | .00093 |
| 3 | 42 | 81 | 17 | 146 | 269 | -.0254 | .00218 | .00161 |
| 4 | 42 | 81 | 16 | 143 | 266 | -.0277 | .00478 | .00220 |
| 5 | 41 | 84 | 17 | 137 | 263 | -.0290 | .00763 | .00313 |
| 6 | 38 | 100 | 13 | 146 | 284 | -.0201 | .00068 | .00103 |
| 7 | 45 | 77 | 15 | 136 | 259 | -.0284 | .00383 | .00238 |
| 8 | 50 | 61 | 6 | 119 | 230 | -.0260 | -.00893 | .00046 |
| 9 | 43 | 90 | 11 | 135 | 268 | -.0211 | -.00089 | .00095 |
| 10 | 48 | 72 | 19 | 131 | 251 | -.0318 | -.00236 | .00159 |
| 11 | 46 | 78 | 22 | 132 | 256 | -.0315 | .00025 | .00216 |
| 12 | 44 | 84 | 19 | 129 | 257 | -.0317 | -.0045 | .00227 |
| 13 | 47 | 77 | 22 | 131 | 254 | -.0320 | -.0028 | .00218 |

FIG. 14

HOLOGRAPHIC STORAGE LENSES

This application is a division of Ser. No. 10/102,974, filed Mar. 22, 2002, now U.S. Pat. No. 6,847,498 which is a non-provisional application claiming priority from 60/369,343, filed Oct. 17, 2001. These prior applications are hereby incorporated by reference.

FIELD OF THE INVENTION

The present invention relates to lenses suitable for holographic storage devices. More specifically this invention relates to lenses that are suitable for writing to and reading from holographic storage mediums.

BACKGROUND

Holographic storage systems are storage systems that use holographic storage media to store data. Holographic storage media includes photorefractive materials that can take advantage of the photorefractive effect described by David M. Pepper et al., in "The Photorefractive Effect," *Scientific American,* October 1990 pages 62–74. The index of refraction in photorefractive materials can be changed by light that passes through them. Holographic storage media also include photopolymers, such as those described in Coufal et al., "Photopolymers for Digital Holographic Storage" in HOLOGRAPHIC DATA STORAGE, 199–207 (2000), and photochromatic materials. By controllably changing the index of refraction in such materials, high-density, high-capacity, and high-speed storage of information in holographic storage media can be accomplished.

In the typical holographic storage system, two coherent light beams are directed onto a storage medium. The first coherent light beam is a signal beam, which is used to encode data. The second coherent light beam is a reference light beam. The two coherent light beams intersect within the storage medium to produce an interference pattern. The storage medium records this interference pattern by changing its index of refraction to form an image of the interference pattern.

The recorded information, stored as a holographic image, can be read by illuminating the holographic image with a reference beam. When the holographic image is illuminated with a reference beam at an appropriate angle, a signal beam containing the information stored is produced. Most often the appropriate angle for illuminating the holographic image will be the same as the angle of the reference beam used for recording the holographic image. More than one holographic image may be stored in the same volume by, for example, varying the angle of the reference beam during recording.

Varying the angle of the reference beam during recording to store multiple holographic images in the same volume is called angle multiplexing. In addition to angle multiplexing, other techniques for storing multiple holograms in the same volume include wavelength multiplexing, phase code multiplexing, correlation multiplexing, shift multiplexing, aperture multiplexing, and fractal multiplexing. Since the same volume can be used to store multiple holographic recordings, high storage capacities can be obtained using holographic storage systems.

Information can be encoded within the signal beam in a variety of ways. One way of encoding information into a signal beam is by using an electronic mask, called a spatial-light modulator (SLM). Typically, a SLM is a two dimensional matrix of pixels. Each pixel in the matrix can be directed to transmit or reflect light, corresponding to a binary 1, or to block light, corresponding to a binary 0. The signal beam, once encoded by the SLM, is relayed onto the storage medium, where it intersects with a reference beam to form an interference pattern. The interference pattern records the information encoded in the signal beam to the holographic storage medium.

The information recorded in the holographic storage medium is read by illuminating the storage medium with a reference beam. The resulting signal beam is then typically imaged onto a sensor, such as a Charge Coupled Device (CCD) array or an CMOS active pixel sensor. The sensor is attached to a decoder, which is capable of decoding the data.

A holographic storage medium includes the material within which a hologram is recorded and from which an image is reconstructed. A holographic storage medium may take a variety of forms. For example, it may comprise a film containing dispersed silver halide particles, photosensitive polymer films ("photopolymers") or a freestanding crystal such as iron-doped $LiNbO_3$ crystal. U.S. Pat. No. 6,103,454, entitled RECORDING MEDIUM AND PROCESS FOR FORMING MEDIUM, generally describes several types of photopolymers suitable for use in holographic storage media. The patent describes an example of creation of a hologram in which a photopolymer is exposed to information carrying light. A monomer polymerizes in regions exposed to the light. Due to the lowering of the monomer concentration caused by the polymerization, monomer from darker unexposed regions of the material diffuses to the exposed regions. The polymerization and resulting concentration gradient creates a refractive index change forming a hologram representing the information carried by the light.

FIG. 1 illustrates the basic components of a holographic system 100. System 100 contains a SLM 112, a holographic storage medium 114, and a sensor 116. SLM 112 encodes beam 120 with an object image. The image is stored by interfering the encoded signal beam 120 with a reference beam 122 at a location on or within holographic storage medium 114. The interference creates an interference patterns (or hologram) that is captured within medium 114 as a pattern of, for example, a holographic refractive index grating.

It is possible for more than one holographic image to be stored at a single location, or for a holographic image to be stored at a single location, or for holograms to be stored in overlapping positions, by, for example, varying the angle, the wavelength, or the phase of the reference beam 122, depending on the particular reference beam employed. Signal beam 120 typically passes through lenses 130 before being intersected with reference beam 122 in the medium 114. It is possible for reference beam 122 to pass through lenses 132 before this intersection. Once data is stored in medium 114, it is possible to retrieve the data by intersecting a reference beam 122 with medium 114 at the same location and at the same angle, wavelength, or phase at which a reference beam 122 was directed during storage of the data. The reconstructed data passes through one or more lenses 134 and is detected by sensor 116. Sensor 116, is for example, a charged coupled device or an active pixel sensor. Sensor 116 typically is attached to a unit that decodes the data.

Typically, lenses 130 comprise a complicated Fourier Transform lens arrangement. A Fourier Transform lens arrangement 134 is then used to transform the signal beam back into its original form during the read phase. Fourier transform lens systems use multiple lens elements to focus the signal beam onto the holographic storage medium during the recording phase and to focus the signal beam from the holographic storage medium during the read phase. Typically, from eight to twelve lens elements are used to focus the signal beams in this manner. The large number of lenses increases the size, weight, and cost of a holographic storage system. Further, using a large number of lenses requires very tight tolerances on the design and arrangement of the lens elements. These constraints limit the commercial suitability of a holographic storage system.

U.S. Pat. No. 6,104,511, discusses some of the problems with conventional multi-element Fourier Transform lenses used for holographic storage units. The series of lenses are replaced by a concave and convex reflectors. However, multiple complex reflectors are still used to perform a complicated Fourier Transform of the image data.

SUMMARY OF THE INVENTION

Disclosed are holographic recording systems, holographic retrieval systems and lenses suitable for holographic recording and retrieval systems. Preferably, the lenses have a small pupil aberration, a flat field of view, a large pupil separation, and a long object distance.

In one embodiment, the holographic recording system comprises an encoding device, a storage medium and a single-component lens placed between the encoding device and the storage medium. The single-component lens directs a signal beam encoded by the encoding device onto a pupil plane positioned at the storage medium. The single-component lens has a pupil aberration that is less than 40% of the on axis pupil radius.

Preferably, the encoding device is a spatial-light modulator. Preferably, the single-component lens has an axial thickness of between 50% of effective focal length (hereinafter EFL) and 110% of EFL. Preferably, the single-component lens comprises at least one material with a refractive index greater than 1.6. Preferably, the single-component lens comprises a first lens element and a second lens element. Preferably, the difference between the refractive index of the first lens element and the second lens element is at least 0.2. Preferably, the single-component lens has a pupil with a separation of 25% of EFL to about 80% of EFL.

Preferably, the single-component lens has a Petzval sum less than 0.0030 mm$^{-1}$. Preferably, the single-component lens has a field-of-view between 50 degrees and 75 degrees. Preferably the single-component lens is telecentric. Preferably, the single-component lens has an object distance from 100% of EFL to 160% of EFL. Preferably, the single-component lens has a pupil separation of from 25% of EFL to 80% of EFL. Preferably, the single-component lens has an f-number from 4.0 to 16.0.

In another embodiment, the holographic retrieval system comprises a storage medium, a sensor, and a single-component lens placed between the sensor and the storage medium. The single-component lens focuses a signal beam emanating from the storage medium onto the sensor. The single-component lens has a pupil aberration that is less than 40% of the on axis pupil radius.

Preferably, the single-component lens has an axial thickness of between 50% of EFL and 110% of EFL. Preferably, the single-component lens comprises at least one material with a refractive index greater than 1.6. Preferably, the single-component lens comprises a first lens element and a second lens element. Preferably, the difference between the refractive index of the first lens element and the second lens element is at least 0.2. Preferably, the single-component lens has a pupil with a separation of 25% EFL to about 80% EFL.

Preferably, the single-component lens has a Petzval sum less than 0.0030 mm$^{-1}$. Preferably, the single-component lens has a field-of-view between 50 degrees and 75 degrees. Preferably, the single-component lens is telecentric. Preferably, the single-component lens has an object distance from 100% of EFL to 160% of EFL. Preferably, the single-component lens has a pupil separation of from 25% of EFL to 80% of EFL. Preferably, the single-component lens has an f-number from 4.0 to 16.0.

In yet another embodiment, the single component lens comprises a meniscus-shaped component. The meniscus shaped component has an axial thickness of between 50% and 110% of EFL of the single-component lens. The single-component lens has a pupil separation that is at least 25% of EFL, an object distance that is at least 100% of EFL from the single-component lens. The single component lens has a first outside aspheric surface having a curvature and a second outside aspheric surface having a curvature. The sum of the curvature of the first aspheric surface and the curvature of the second aspheric surface is between −0.01 mm$^{-1}$ and −0.04 mm$^{-1}$.

Preferably, the single-component lens has an f-number from 4.0 to 16.0. Preferably, the single-component lens has a pupil separation of from 25% of EFL to 80% of EFL. Preferably, the single-component lens is telecentric. Preferably, the single-component lens has a field-of-view between 50 degrees and 75 degrees. Preferably, the single-component lens has a Petzval sum less than 0.0030 mm$^{-1}$. Preferably, the single-component lens comprises at least one material with a refractive index greater than 1.6.

BRIEF DESCRIPTION OF THE DRAWINGS

The invention will be better understood by reference to the Detailed Description of the Invention when taken together with the attached drawings, wherein:

FIG. 14 is a table containing characteristics of the lenses in FIGS. 2–14.

BRIEF DESCRIPTION OF THE DRAWINGS

Figure 1:
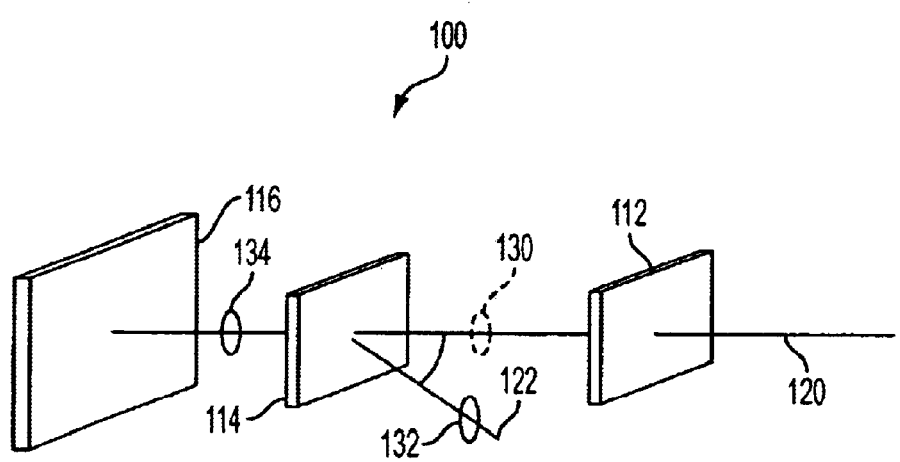

Described are simple and accurate lenses that can be used for holographic storage devices. The lenses need not be capable of forming an accurate Fourier Transformation of the signal beam from the encoding device, which allows for a more compact and less complex lens system.

In a preferred embodiment, the lens unit is a single-component lens. A single-component lens is a single lens element, or two or more lens elements which are all held together in optical contact. Preferably, the single-component lens has one or two lens elements, not including any aspherical caps formed on the lens elements. An aspherical cap is a lens piece that is formed on a lens element. Since the cap is formed on a lens element, and is not a separate piece, an aspherical cap is not considered a separate lens element.

In holographic storage systems, typically information is encoded into the signal beam using a two dimensional encoding device. A preferable type of encoding device is a SLM. A typical SLM is a matrix of squares that have a height and a width, but negligible thickness. Light travels through or is reflected by the SLM and is encoded by this two dimensional pattern. The encoded light is directed onto a photorefractive crystal where the SLM pattern is stored. When the stored pattern is read, the recorded SLM pattern is preferably focused onto a detecting device in its original flat form. A preferable detecting device is a CCD array or a CMOS sensor array.

The same lens unit can be used for both recording and reading or a separate lens units may be used for recording and reading. The lens units need not be capable of accurately Fourier Transforming the encoded signal beam, but preferably any changes made to the signal beam by a lens unit during the recording phase, is reversed by a lens unit during the read phase.

While an exact Fourier Transform is not needed at the storage material plane, preferably pupil aberration is controlled. An enlargement of the pupil due to pupil aberration typically results in an increase in the size of the hologram needed to capture all of the light for reconstruction of the image. As the recording volume is preferably kept as small as possible, the amount of pupil aberration is preferably kept small. The pupil aberration for telecentric lenses is defined as the largest deviation of any ray in the pupil plane of light that is part of a fixed solid angle centered around the parallel chiefray of any field point. It is expressed in a percentage of the on-axis pupil radius.

Preferably pupil aberration is less than 40%. More preferably pupil aberration is less than 20%. Most preferably pupil aberration is less than 10%.

Since information in a holographic storage system is typically encoded and decoded in two dimensional form, a lens unit used in a holographic storage system preferable has a flat field-of-view. A flat field-of-view means that the lens unit is able to focus in a sufficiently flat plane over its field-of-view. A flatter plane allows for more precise storage and retrieval of information in a holographic storage system.

The flatness of the field-of-view is related to the Petzval sum. A lens unit with a flat field-of-view typically has a small Petzval sum.

The Petzval sum can be calculated according to the formula:

$$P = \frac{1}{n_1 f_1} + \frac{1}{n_2 f_2} + \ldots$$

Where P equals the Petzval sum and $f_1, f_2, \ldots$ are the focal lengths of each lens element and aspherical caps in the lens unit, and $n_1, n_2, \ldots$ their respective refractive indices. The Petzval sum is standardized by scaling the lens unit to have a focal length of 100 mm.

Preferably, the Petzval sum of the lens unit is less than about 0.0030 $mm^{-1}$. More preferably, the Petzval sum of the lens unit is less than about 0.0025 $mm^{-1}$. Most preferably, the Petzval sum of the lens unit is less than about 0.0020 $mm^{-1}$.

In a single-component lens there are three preferred ways of reducing the Petzval sum. The first way of reducing the Petzval sum is to increase the refractive index of the lens material. The second way of reducing the Petzval sum is to increase the thickness of a meniscus shaped lens element. The third way of reducing the Petzval sum is to use a large refractive index difference between lens elements when two lens elements are used to form the single-component lens.

In one aspect of the invention, the lens unit has at least one element made of a material that has a refractive index greater than about 1.6. More preferably, the lens unit has at least one component made of a material that has a refractive index greater than about 1.8. Most preferably, the lens unit has at least one component made-of a material that has a refractive index greater than about 1.9.

In another aspect of the invention, the lens unit is meniscus shaped and bent towards the entrance pupil of the lens unit. Preferably, the lens unit has an axial thickness of between about 50% and about 110% of the effective focal length (EFL). More preferably, the lens unit has an axial thickness of between about 60% and about 100% of the EFL. Most preferably, the lens unit has an axial thickness of between about 70% and about 90% of the EFL.

In yet another aspect of the invention, the lens unit comprises more than one lens element. The Petzval sum can be reduced by increasing the difference between the refractive index of the lens elements. Preferably, the difference between the refractive index of one lens element in the lens unit and another lens element in the lens unit is at least about 0.2. More preferably, the difference between the refractive index of one lens element in the lens unit and another lens element in the lens unit is at least about 0.3. Most preferably, the difference between the refractive index of one lens element in the lens unit and another lens element in the lens unit is at least about 0.4.

The lens unit may have spherical aberration. This can adversely affect the image quality of the lens unit. As the number of parameters in a single component lens is very limited, preferably, the spherical aberration of the lens unit is corrected using an aspheric surface.

The Petzval sum can be minimized in a single component lens unit by designing lenses with the sum of the outside curvatures close to zero. The outside curvature is defined as the inverse of the radius of curvature of the outside surfaces of the lens unit.

Again, in order to standardize the specifications of the lens unit, the outside curvature is calculated after scaling the lens unit to have a focal length of 100 mm. Preferably, the lens unit has a sum of outside curvatures of between −0.05 $mm^{-1}$ and 0.0 $mm^{-1}$. More preferably, the lens unit has a sum of outside curvatures of between −0.04 $mm^{-1}$ and a −0.01 $mm^{-1}$. Most preferably, the lens unit has a sum of outside curvatures of between −0.035 $mm^{-1}$ and a −0.02 $mm^{-1}$.

Preferably, the lens unit provides a large field-of-view. A larger field-of-view for the lens unit during the recording phase allows for a larger SLM area to be encoded and recorded at one time. Correspondingly, a larger field-of-view for the lens unit during the reading phase allows a larger area of encoded information to be projected from the holographic storage medium onto a sensor for decoding at one time.

Preferably, the field-of-view of the lens unit is from about 50 degrees to about 75 degrees. More preferably, the field-of-view of the lens unit is from about 55 degrees to about 70 degrees. Most preferably, the field-of-view of the lens unit is from about 60 degrees to about 65 degrees.

Preferably, the lens unit is telecentric. A telecentric lens maintains a near zero chiefray angle at the focal plane over the full field of view. A change in the image geometry during focusing is thus reduced or eliminated.

The f-number of the lens unit relates to the maximum resolution obtainable by the lens unit. A lower f-number allows for the lens unit to provide a higher resolution. A higher resolution allows for more precise holographic storage and reading and/or allows more data to be stored in the same amount of space. Preferably, the f-number is less than about 16.0. More preferably, the f-number is less than about 11.0. Most preferably, the f-number is less than about 8.0.

Typically, lowering the f-number of a lens unit involves more optical correction and a more complex lens unit. Since more complex lens units are more difficult to align and manufacture, preferably the lens unit has an f-number greater than about 4.0. More preferably, the lens unit has an f-number greater than about 5.0. Most preferably, the lens unit has an f-number great than about 6.0.

Preferably, the lens unit has an outside pupil separation with a large clearance. The pupil separation is the distance from the lens unit to this location. Preferably, the pupil location is chosen as the recording area to minimize the amount of space used for storage. The recording area may need to be accessible, to allow for placement of the recording medium at the recording area location and to allow for placement of a reference beam which interests with the storage beam at the recording area. Accordingly, preferably the pupil location has a relatively large clearance from the lens unit.

Preferably, the lens unit has a pupil separation that is about 25% to about 80% of the EFL. More preferably, the lens unit has a pupil separation that is about 30% to about 70% of the EFL. Most preferably, the lens unit has a pupil separation that is about 40% to about 60% of the EFL.

The lens preferably has a long object distance. The object distance is the distance between the information being encoded and the lens unit. In one embodiment, illumination light, which forms the signal beam, illuminates a SLM on a face towards the lens unit. In this embodiment, the illumination light illuminates the SLM, the SLM encodes the illumination light to form the signal beam, and then the SLM reflects the encoded signal beam to the lens unit. The lens unit then directs the signal beam onto the holographic storage medium, where the encoded signal beam is recorded. In this arrangement, the object distance must be large enough to allow sufficient illumination light between the lens unit and the SLM. During the reading phase, the object distance is the location of the sensor.

Preferably, the object distance is from about 100% of the EFL to about 160% of the EFL. More preferably, the object distance of the lens unit is from about 110% of the EFL to about 150% of the EFL. Most preferably, the object distance is from about 120% of the EFL to about 130% of the EFL.

The present invention will be better understood with reference to the following examples, shown in FIGS. 2–13 and Table 1. These examples are intended to illustrate specific embodiments within the overall scope of the invention as claimed.

EXAMPLE 1

Figure 2:
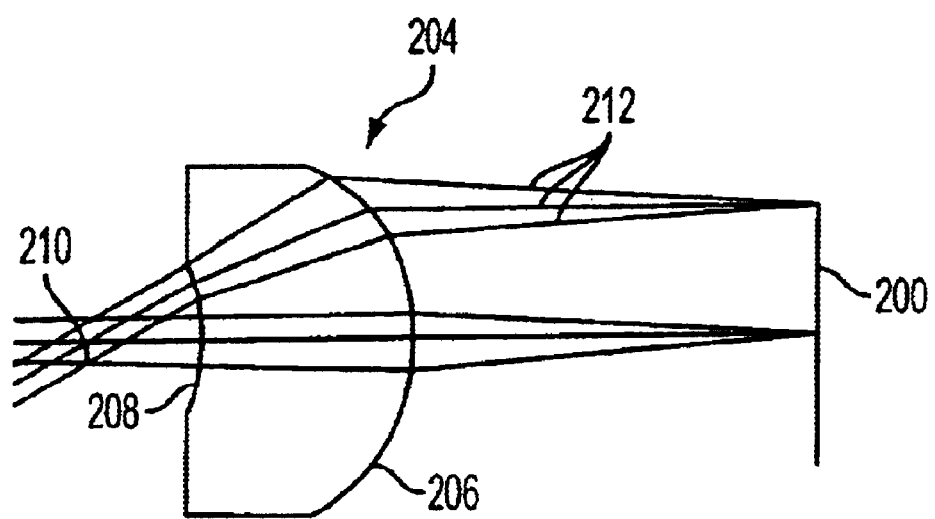
FIG. 2 is a lens unit according to the present invention.

FIG. 2 shows a single element lens unit 204 made from Cleartran®, a lens material available from Rohm and Haas. Image plane 200 is where the encoding is placed during recording and where the sensor is placed during reading. Pupil location 210 is where the recording medium is placed for both recording and reading. Light rays 212 go from image plane 200 towards pupil location 210 during the recording phase and from pupil location 210 towards image plane 200 during the reading phase. Lens unit 204 is a single element design that has a first outside aspheric surface 208 and a second outside aspheric surface 206. The first outside aspheric surface 208 has a base radius of curvature −98.6 mm. The second outside aspheric surface 206 has a base radius of curvature of −85.2 mm.

Lens unit 204 has an effective focal length of 100.0 mm, an F-number of 6.5, and a field-of-view of 60 degrees. The overall length of the holographic storage system from pupil location 210 to image plane 200 is 271 mm. The distance from the pupil location 210 to the vertex of the first outside aspheric surface 208 is 42.5 mm. The thickness of the lens unit from the vertex of aspheric surface 208 to the vertex of surface 206 is 81.0 mm. The distance from the vertex of aspheric surface 206 to image plane 200 is 147.9 mm. The characteristics of lens unit 204 are summarized in Table 1.

TABLE 1

| Lens Unit 204 | | | |
| --- | --- | --- | --- |
| Effective Focal Length (EFL) = 100.0 mm<br>Field of view 2ω = 60 deg<br>F-number: 6.5<br>Overall length: 271 mm (distance from pupil location to image plane) | | | |
| Position on FIG. 2 | Radius of curvature R (mm) | Central thickness/ airspace t* (mm) | Lens Material |
| 210 | 0.0 | 42.5 (y = 08, x = 210) | |
| 208 | −98.6** | 81.0 (y = 206, x = 208) | Cleartran ® |
| 206 | −85.2** | 147.9 (y = 200, x = 200) | |
| 0.0 | | | |

*t = distance between positions y and x, wherein x and y are positions in FIG. 2.
**The aspheric coefficients are:
Surface 208: k = 8.20 a4 = −4.0e−7 a6 = −2.1e−11 a8 = 2.0e−14
Surface 206: k = 0.20 a4 = 1.0e−8 a6 = 8.0e−13 a8 = 3.4e−16

EXAMPLE 2

Figure 3:
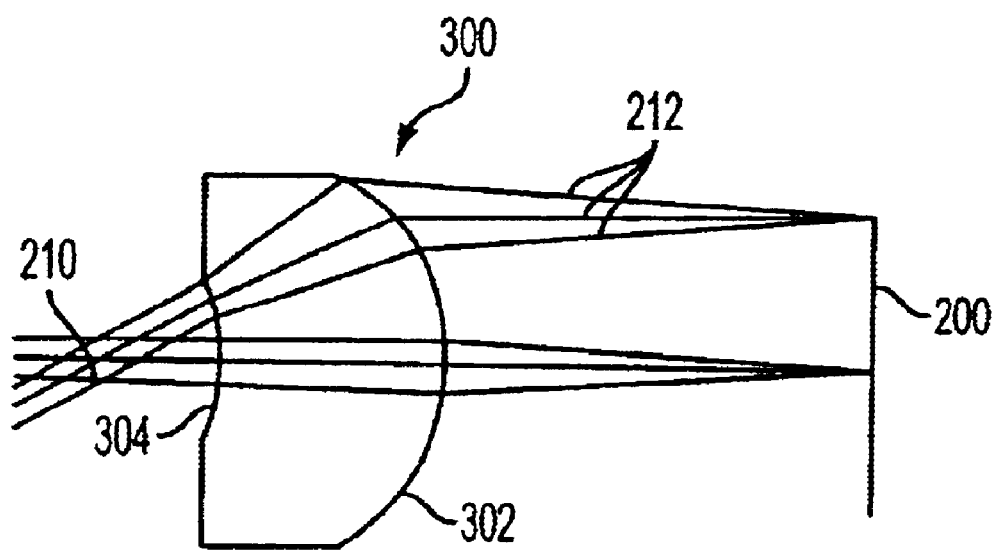
FIG. 3 is another lens unit according to the present invention.

FIG. 3 shows a single element lens unit 300 made from LaSF35, a lens material available from Schott Glass Technologies, Inc. Lens unit 300 has a first outside aspheric surface 304 and a second outside aspheric surface 302. The first outside aspheric surface 304 has a base radius of curvature of −90.0 mm. The second outside aspheric surface 302 has a base radius of curvature of −70.0 mm.

Lens unit 300 has an effective focal length of 100.0 mm, an F-number of 8.0, and a field-of-view of 60 degrees. The overall length of the holographic storage system from pupil location 210 to image plane 200 is 269 mm. The distance from the pupil location 210 to the vertex of the first outside aspheric surface 304 is 41.8 mm. The thickness of the lens unit from the vertex of aspheric surface 304 to the vertex of aspheric surface 302 is 81.06 mm. The distance from the vertex of aspheric surface 302 to image plane 200 is 146.0 mm. The characteristics of lens unit 300 are summarized in Table 2.

TABLE 2

Lens Unit 300

Effective Focal Length (EFL) = 100.0 mm
Field of view 2ω = 60 deg
F-number: 8.0
Overall length: 269 mm (distance from pupil location to image plane

| Position on FIG. 3 | Radius of curvature R (mm) | Central thickness/ airspace t* (mm) | Lens Material |
|---|---|---|---|
| 210 | 0.0 | 41.8 (y = 304, x = 210) | |
| 304 | −90.0** | 81.06 (y = 302, x = 304) | LaSF35 |
| 302 | −70.0** | 146.0 (y = 200, x = 302) | |
| | 0.0 | | |

*t = distance between positions y and x, wherein x and y are positions in FIG. 3.
**The aspheric coefficients are:
Surface 304: k = 8.8 a4 = −9.0e−7 a6 = 3.4e−10 a8 = −3.7e−13
Surface 302: k = 0.0 a4 = 3.0e−8 a6 = 4.0e−12 a8 = 6.0e−16

EXAMPLE 3

Figure 4:
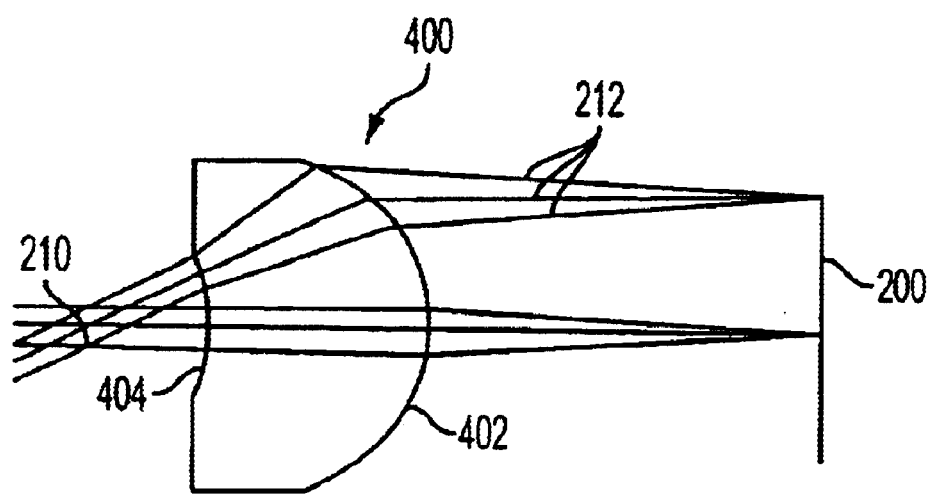
FIG. 4 is another lens unit according to the present invention.

FIG. 4 shows a single element lens unit 400 made from SFL57, a lens material available from Schott Glass Technologies, Inc. Lens unit 400 has a first outside aspheric surface 404 and a second outside aspheric surface 402. The first outside aspheric surface 404 has a base radius of curvature of −87.3 mm. The second outside aspheric surface 402 has a base radius of curvature of −61.6 mm.

Lens unit 400 has an effective focal length of 100.0 mm, an F-number of 8.0, and a field-of-view of 56 degrees. The overall length of the holographic storage system from pupil location 210 to image plane 200 is 266 mm. The distance from the pupil location 210 to the vertex of the first outside aspheric surface 404 is 41.7 mm. The thickness of the lens unit from the vertex of aspheric surface 404 to the vertex of aspheric surface 402 is 80.7 mm. The distance from the vertex of aspheric surface 402 to image plane 200 is 143.1 mm. The characteristics of lens unit 400 are summarized in Table 3.

TABLE 3

Lens Unit 400

Effective Focal Length (EFL) = 100.0 mm
Field of view 2ω = 56 deg
F-number: 8.0
Overall length: 266 mm

| Position on FIG. 4 | Radius of curvature R (mm) | Central thickness/ airspace t* (mm) | Lens Material |
|---|---|---|---|
| 210 | 0.0 | 41.7 (y = 404, x = 210) | |
| 404 | −87.3** | 80.7 (y = 402, x = 404) | SFL57 |
| 402 | −61.6** | 143.1 (y = 200, x = 402) | |
| | 0.0 | | |

*t = distance between positions y and x, wherein x and y are positions in FIG. 4.
**The aspheric coefficients are:
Surface 404: k = 9.8 a4 = −1.6e−6 a6 = 1.0e−9 a8 = −1.0e−12
Surface 402: k = −.1 a4 = 4.3e−8 a6 = 1.0e−11 a8 = 1.7e−15

EXAMPLE 4

Figure 5:
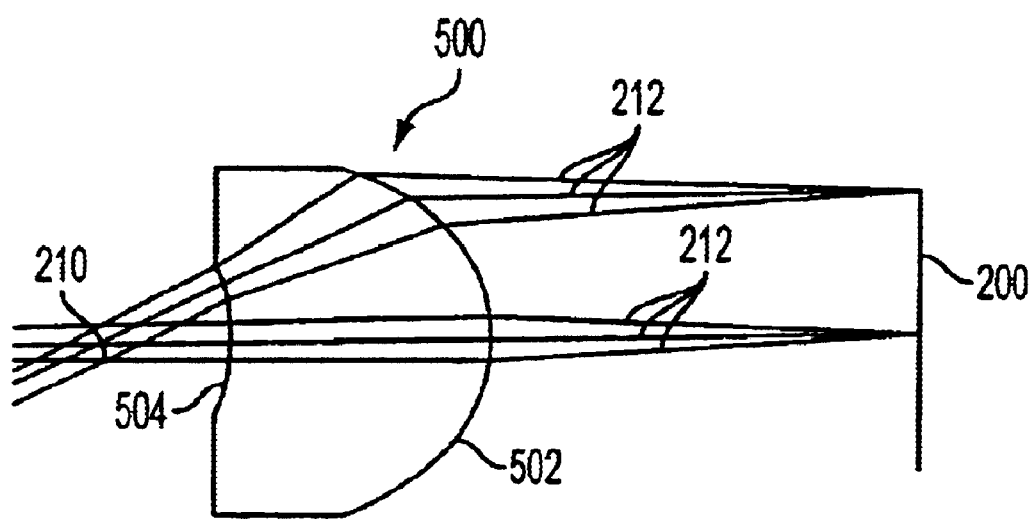
FIG. 5 is another lens unit according to the present invention.

FIG. 5 shows a single element lens unit 500 made from LaK9, a lens material available from Schott Glass Technologies, Inc. Technologies. Lens unit 500 has a first outside aspheric surface 504 and a second outside aspheric surface 502. The first outside aspheric surface 504 has a base radius of curvature of −93.6 mm. The second outside aspheric surface 502 has a base radius of curvature of −54.6 mm.

Lens unit 500 has an effective focal length of 100.1 mm, an F-number of 9.0, and a field-of-view of 54 degrees. The overall length of the holographic storage system from pupil location 210 to image plane 200 is 263 mm. The distance from the pupil location 210 to the vertex of the first outside aspheric surface 504 is 41.0 mm. The thickness of the lens unit from the vertex of aspheric surface 504 to the vertex of aspheric surface 502 is 84.43 mm. The distance from the vertex of aspheric surface 502 to image plane 200 is 137.5 mm. The characteristics of lens unit 500 are summarized in Table 4.

TABLE 4

Lens Unit 500

Effective Focal Length (EFL) = 100.1
Field of view 2ω = 54 deg
F-number: 9.0
Overall length: 263 mm (distance from pupil location to image plane)

| Position on FIG. 5 | Radius of curvature R (mm) | Central thickness/ airspace t* (mm) | Lens Material |
|---|---|---|---|
| 210 | 0.0 | 41.0 (y = 054, x = 210) | |
| 504 | −93.6** | 84.43 (y = 502, x = 504) | LaK9 |
| 502 | −54.6** | 137.5 (y = 200, x = 502) | |
| | 0.0 | | |

*t = distance between positions y and x, wherein x and y are positions in FIG. 5.
**The aspheric coefficients are:
Surface 504: k = 13.2 a4 = −2.4e−6 a6 = 2.0e−9 a8 = −2.0e−12
Surface 502: k = −.22 a4 = 1.0e−7 a6 = 1.0e−11 a8 = 6.0e−15

EXAMPLE 5

Figure 6:
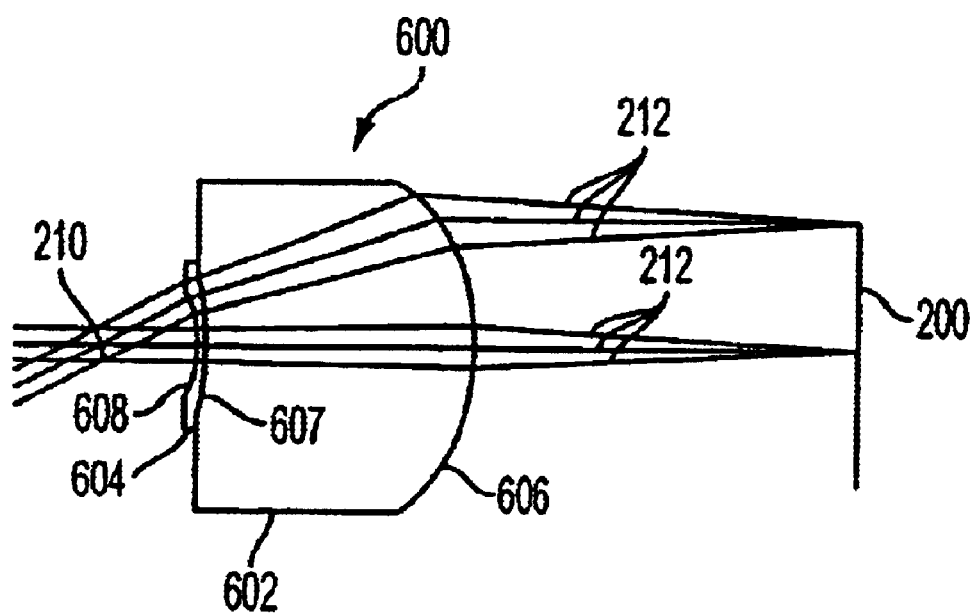
FIG. 6 is another lens unit according to the present invention.

FIG. 6 shows a lens unit 600. Lens unit 600 has a lens element 602 made from Cleartran® and an aspheric cap 604 made of polystyrene. Lens unit 600 has a first outside aspheric surface 608 and a second outside aspheric surface 606. Lens unit has a first inside surface 607 between the lens element 602 and the aspheric cap 604. The first outside aspheric surface 608 has a base radius of curvature of −103.0 mm. The second outside aspheric surface 602 has a base radius of curvature of −96.25 mm. The first inside surface 607 has a radius of −150.0 mm.

Lens unit 600 has an effective focal length of 100.0 mm, an F-number of 8.0, and a field-of-view of 60 degrees. The overall length of the holographic storage system from pupil location 210 to image plane 200 is 284 mm. The distance from the pupil location 210 to the vertex of the first outside aspheric surface 608 is 38.0 mm. The thickness of the lens unit from the vertex of first outside aspheric surface 608 to the vertex of first inside surface 607 is 2.0 mm. The distance from the vertex of the first inside surface 607 to the vertex of the second outside aspheric surface 606 is 98.0 mm. The distance from the vertex of second outside aspheric surface 606 to image plane 200 is 146.4 mm. The characteristics of lens unit 600 are summarized in Table 5.

TABLE 5

Lens Unit 600

Effective Focal Length (EFL) = 100.0 mm  
Field of view 2ω = 60 deg  
F-number: 8.0  
Overall length: 284 mm (distance from pupil location to image plane)

| Position on FIG. 6 | Radius of curvature R (mm) | Central thickness/ airspace t* (mm) | Lens Material |
|---|---|---|---|
| 210 | 0.0 | 38.0 (y = 608, x = 210) | |
| 608 | −103.0** | 2.0 (y = 607, x = 608) | polystyrene |
| 607 | −150 | 98.0 (y = 606, x = 607) | Cleartran ® |
| 606 | −96.25 | 146.4 (y = 200, x = 606) | |
| | 0.0 | | |

*t = distance between positions y and x, wherein x and y are positions in FIG. 6.  
**The aspheric coefficients are:  
Surface 608: k = 10.0 a4 = −1.45e-6 a6 = 1.0e-10 a8 = −1.7e-13

EXAMPLE 6

Figure 7:
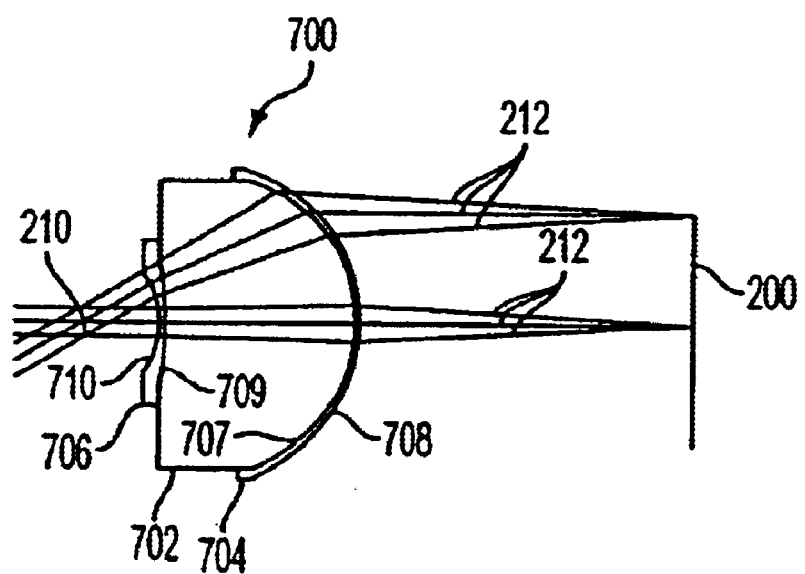
FIG. 7 is another lens unit according to the present invention.

FIG. 7 shows a lens unit 700 that has a lens element 702, a first aspheric cap 706, and a second aspheric caps 704. The lens element 702 is made out of SFL57, a lens material available from Schott Glass Technologies, Inc. The first aspheric cap and the second aspheric cap are made from polystyrene. Lens unit 700 has a first outside aspheric surface 710 and a second outside aspheric surface 708. Lens unit 700 has a first inside surface 709 and a second inside surface 707. The first outside aspheric surface 710 has a base radius of curvature of −81.3 mm. The second outside aspheric surface 708 has a base radius of curvature of −62.0 mm. The first inside surface 709 has a radius of curvature of −190.0 mm. The second inside surface 707 has a radius of curvature of −62.0 mm.

Lens unit 700 has an effective focal length of 100.0 mm, an F-number of 8.0, and a field-of-view of 56 degrees. The overall length of the holographic storage system from pupil location 210 to image plane 200 is 259 mm. The distance from the pupil location 210 to the vertex of the first outside aspheric surface 710 is 44.7 mm. The thickness of the lens unit from the vertex of first outside aspheric surface 710 to the vertex of first inside surface 709 is 2.0 mm. The distance from the vertex of the first inside surface 709 to the second inside surface 707 is 73.4 mm. The distance from the vertex of the second inside surface 707 to the vertex of the second outside aspheric surface 708 is 2.0 mm. The distance from the vertex of second outside aspheric surface 708 to image plane 200 is 136.5 mm. The characteristics of lens unit 700 are summarized in Table 6.

TABLE 6

Lens Unit 700

Effective Focal Length (EFL) = 100.0 mm  
Field of view 2ω = 56 deg  
F-number: 8.0  
Overall length: 259 mm (distance from pupil location to image plane)

| Position on FIG. 7 | Radius of curvature R (mm) | Central thickness/ airspace t* (mm) | Lens Material |
|---|---|---|---|
| 210 | 0.0 | 44.7 (y = 710, x = 210) | |
| 710 | −81.3** | 2.0 (y = 709, x = 710) | Polystyrene |
| 709 | −190.0 | 73.4 (y = 707, x = 709) | SFL57 |
| 707 | −62.0 | 2.0 (y = 708, x = 707) | Polystyrene |
| 708 | −62.0** | 136.5 (y = 200, x = 708) | |
| | 0.0 | | |

*t = distance between positions y and x, wherein x and y are positions in FIG. 7.  
**The aspheric coefficients are:  
Surface 710: k = 8.3 a4 = −3.0e-6 a6 = 3.1e-9 a8 = −3.3e-12  
Surface 708: k = −.12 a4 = 1.0e-8 a6 = 4.0e-11 a8 = −2.0e-15

EXAMPLE 7

Figure 8:
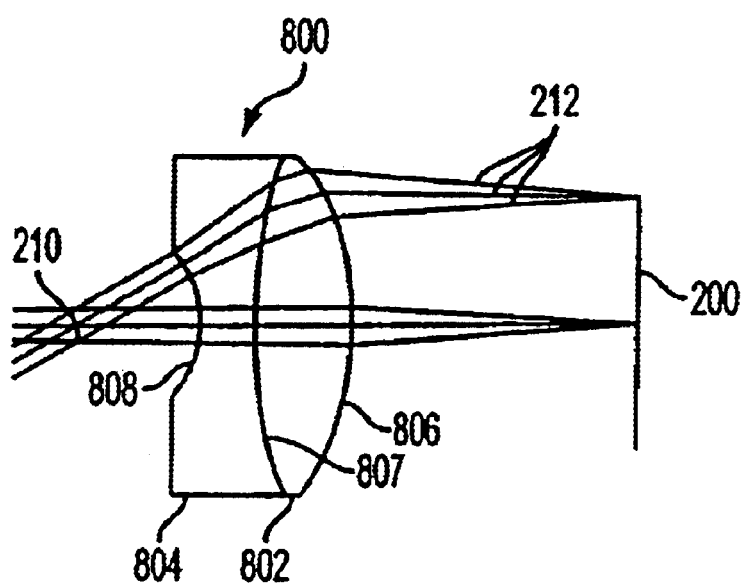
FIG. 8 is another lens unit according to the present invention.

FIG. 8 shows a lens unit 800. Lens unit 800 has two lens elements 804 and 802. The first lens element 804 is made out of FK3, a lens material available from Schott Glass Technologies, Inc. The second lens element 802 is made out of Cleartran®. Lens unit 800 has a first outside aspheric surface 808 and a second outside aspheric surface 806. Lens unit 800 has a first inside surface 807. The first outside aspheric surface 808 has a base radius of curvature of −57.3 mm. The second outside aspheric surface 806 has a base radius of curvature of −117.3 mm. The first inside surface 807 has a radius of curvature of 250.0 mm.

Lens unit 800 has an effective focal length of 100.0 mm, an F-number of 5.6, and a field-of-view of 70 degrees. The overall length of the holographic storage system from pupil location 210 to image plane 200 is 230 mm. The distance from the pupil location 210 to the vertex of the first outside aspheric surface 808 is 50.0 mm. The thickness of the lens unit from the vertex of first outside aspheric surface 808 to the vertex of first inside surface 807 is 21.0 mm. The distance from the vertex of the first inside surface 807 to the vertex of the second outside aspheric surface 806 is 40.0 mm. The distance from the vertex of second outside aspheric surface 806 to image plane 200 is 118.5 mm. The characteristics of lens unit 800 are summarized in Table 7.

TABLE 7

Lens Unit 800

Effective Focal Length (EFL) = 100.0 mm  
Field of view 2ω = 70 deg  
F-number: 5.6  
Overall length: 230 (distance from pupil location to image plane)

| Position on FIG. 8 | Radius of curvature R (mm) | Central thickness/ airspace t* (mm) | Lens Material |
|---|---|---|---|
| 210 | 0.0 | 50.0 (y = 808, x = 210) | |
| 808 | −57.3** | 21.0 (y = 807, x = 808) | FK3 |
| 807 | 250.0 | 40.0 (y = 806, x = 807) | Cleartran ® |
| 806 | −117.3** | 118.5 (y = 200, x = 806) | |
| | 0.0 | | |

*t = distance between positions y and x, wherein x and y are positions in FIG. 8.  
**The aspheric coefficients are:  
Surface 808: k = 0.7 a4 = −1.6e-6 a6 = −1.0e-10 a8 = 5.0e-14  
Surface 806: k = 0.0 a4 = 5.1e-8 a6 = 2.49e-11 a8 = −1.0e-15

EXAMPLE 8

Figure 9:
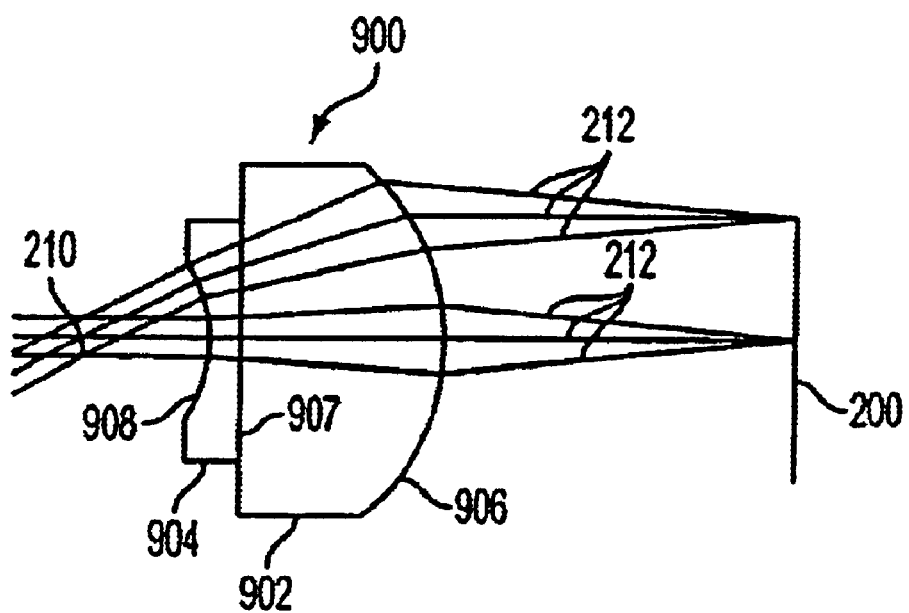
FIG. 9 is another lens unit according to the present invention.

FIG. 9 shows a lens unit 900. Lens unit 900 has two lens elements 904 and 902. The first lens, element is Lens element 904 is made out of SF6, a lens material available from Schott Glass Technologies, Inc. The second lens element 902 is made out of Cleartran®. Lens unit 900 has a first outside aspheric surface 908 and a second outside surface 906. Lens unit 900 has a first inside surface 907. The first outside aspheric surface 908 has a base radius of curvature of −91.0 mm. The second outside surface 906 has a base radius of curvature of −99.0 mm. The first inside surface 907 is flat.

Lens unit 900 has an effective focal length of 100.0 mm, an F-number of 5.6, and a field-of-view of 60 degrees. The overall length of the holographic storage system from pupil location 210 to image plane 200 is 268 mm. The distance from the pupil location 210 to the vertex of the first outside aspheric surface 908 is 43.0 mm. The thickness of the lens unit from the vertex of first outside aspheric surface 908 to the first inside surface 907 is 12.0 mm. The distance from the first inside surface 907 to the vertex of the second outside aspheric surface 906 is 77.7 mm. The distance from the vertex of second outside aspheric surface 906 to image plane 200 is 135.0 mm. The characteristics of lens unit 900 are summarized in Table 8.

TABLE 8

Lens Unit 900

Effective Focal Length (EFL) = 100.0 mm
Field of view 2ω = 60 deg
F-number: 5.6
Overall length: 268 mm (distance from pupil location to image plane)

| Position on FIG. 9 | Radius of curvature R (mm) | Central thickness/ airspace t* (mm) | Lens Material |
| --- | --- | --- | --- |
| 210 | 0.0 | 43.0 (y = 908, x = 210) | |
| 908 | −91.0** | 12.0 (y = 907, x = 908) | SF6 |
| 907 | 0.0 | 77.7 (y = 906, x = 907) | Cleartran ® |
| 906 | −99.0 | 135.0 (y = 200, x = 906) | |
| 0.0 | | | |

*t = distance between positions y and x, wherein x and y are positions in FIG. 9.
**The aspheric coefficients are:
Surface 908: k = 5.5 a4 = −5.0e−7 a6 = 1.3e−10 a8 = −1.7e−13

EXAMPLE 9

Figure 10:
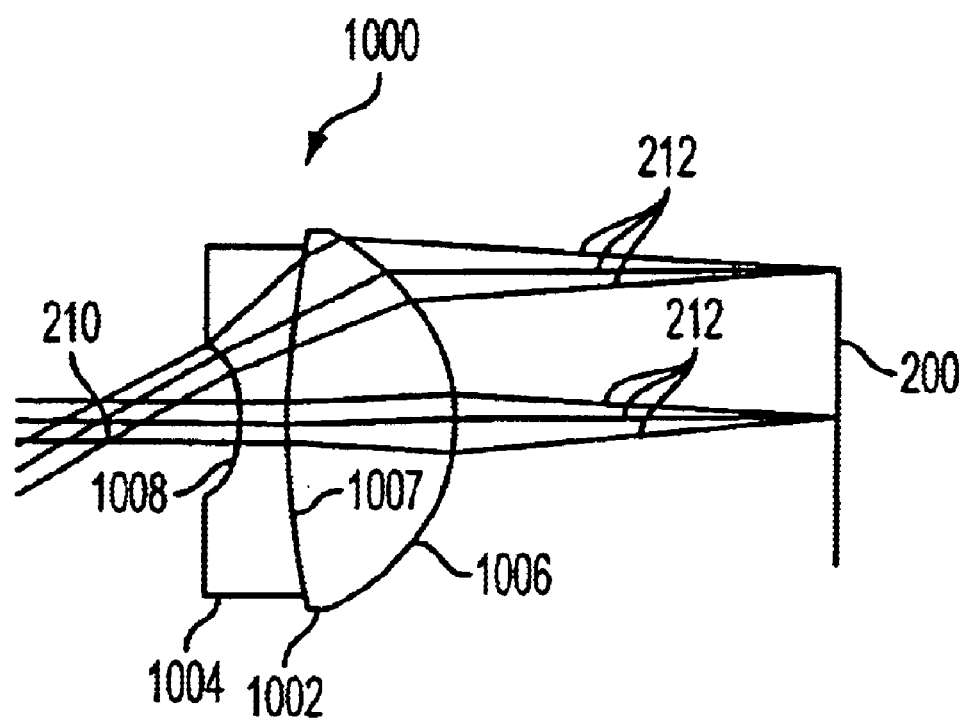
FIG. 10 is another lens unit according to the present invention.

FIG. 10 shows a lens unit 1000. Lens unit 1000 has two lens elements 1004 and 1002. The first lens element 1004 is made out of BK7, a lens material available from Schott Glass Technologies, Inc. The second lens element 1002 is made out of LAH78, a lens material also available from Ohara Corporation. Lens unit 1000 has a first outside aspheric surface 1008 and a second outside aspheric surface 1006. Lens unit 1000 has a first inside surface 1007. The first outside aspheric surface 1008 has a base radius of curvature of −58.6 mm. The second outside aspheric surface 1006 has a base radius of curvature of −68.0 mm. The first inside surface 1007 has a radius of curvature of 320.0 mm.

Lens unit 1000 has an effective focal length of 100.0 mm, an F-number of 7.0, and a field-of-view of 60 degrees. The overall length of the holographic storage system from pupil location 210 to image plane 200 is 251 mm. The distance from the pupil location 210 to the vertex of the first outside aspheric surface 1008 is 48.0 mm. The thickness of the lens unit from the vertex of first outside aspheric surface 1008 to the vertex of first inside surface 1007 is 15.0 mm. The distance from the vertex of the first inside surface 1007 to the vertex of the second outside aspheric surface 1006 is 57.0 mm. The distance from the vertex of second outside aspheric surface 1006 to image plane 200 is 131.2 mm. The characteristics of lens unit 1000 are summarized in Table 9.

TABLE 9

Lens Unit 1000

Effective Focal Length (EFL) = 100.0 mm
Field of view 2ω = 60 deg
F-number: 7.0
Overall length: 251 mm (distance from pupil location to image plane)

| Position on FIG. 10 | Radius of curvature R (mm) | Central thickness/ airspace t* (mm) | Lens Material |
| --- | --- | --- | --- |
| 210 | 0.0 | 48.0 (y = 1008, x = 210) | |
| 1008 | −58.6** | 15.0 (y = 1007, x = 1008) | BK7 |
| 1007 | 320.0 | 57.0 (y = 1006, x = 1007) | LAH78 |
| 1006 | −68.0** | 131.2 (y = 200, x = 1006) | |
| 0.0 | | | |

*t = distance between positions y and x, wherein x and y are positions in FIG. 10.
**The aspheric coefficients are:
Surface 1008: k = 2.8 a4 = −7.8e−7 a6 = −1.5e−9 a8 = 5.0e−13
Surface 1006: k = −1.1 a4 = −3.0e−7 a6 = −4.0e−11 a8 = 2.0e−15

EXAMPLE 10

Figure 11:
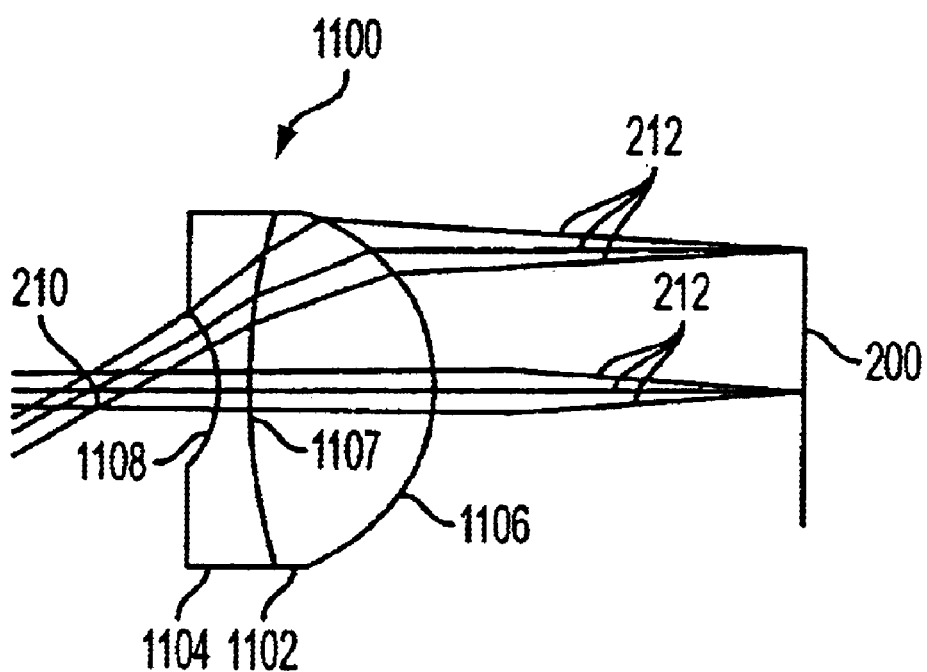
FIG. 11 is another lens unit according to the present invention.

FIG. 11 shows a lens unit 1100. Lens unit 1100 has two lens elements 1104 and 1102. The first lens element 1104 is made out of BK7. The second lens element 1102 is made out of LAH53, a lens material also available from Ohara Corporation. Lens unit 1100 has a first outside aspheric surface 1108 and a second outside aspheric surface 1106. Lens unit 1100 has a first inside surface 1107. The first outside aspheric surface 1108 has a base radius of curvature of −64.0 mm. The second outside aspheric surface 1106 has a base radius of curvature of −63.0 mm. The first inside surface 1107 has a radius of curvature of 276.0 mm.

Lens unit 1100 has an effective focal length of 100.0 mm, an F-number of 8.0, and a field-of-view of 60 degrees. The overall length of the holographic storage system from pupil location 210 to image plane 200 is 266 mm. The distance from the pupil location 210 to the vertex of the first outside aspheric surface 1108 is 46.0 mm. The thickness of the lens unit from the vertex of first outside aspheric surface 1108 to the vertex of first inside surface 1107 is 12.0 mm. The distance from the vertex of the first inside surface 1107 to the vertex of the second outside aspheric surface 1106 is 66.2 mm. The distance from the vertex of second outside aspheric surface 1106 to image plane 200 is 131.9 mm. The characteristics of lens unit 1100 are summarized in Table 10.

TABLE 10

Lens Unit 1100

Effective Focal Length (EFL) = 100.0 mm
Field of view 2ω = 60 deg
F-number: 8.0
Overall length: 256 mm (distance from pupil location to image plane)

| Position on FIG. 11 | Radius of curvature R (mm) | Central thickness/ airspace t* (mm) | Lens Material |
| --- | --- | --- | --- |
| 210 | 0.0 | 46.0 (y = 1108, x = 210) | |
| 1108 | −64.0** | 12.0 (y = 1107, x = 1108) | BK7 |

TABLE 10-continued

Lens Unit 1100

| 1107 | 276.0 | 66.2 (y = 1106, x = 1107) | LAH53 |
|------|-------|---------------------------|-------|
| 1106 | −63.0** | 133.9 (y = 200, x = 1106) | |
| | 0.0 | | |

*t = distance between positions y and x, wherein x and y are positions in FIG. 11.
**The aspheric coefficients are:
Surface 1108: k = 4.0 a4 = −2.0e−6 a6 = 1.0e−9 a8 = −2.0e−12
Surface 1106: k = −1.0 a4 = −3.6e−7 a6 = −1.5e−11 a8 = −8.3e−15

EXAMPLE 11

Figure 12:
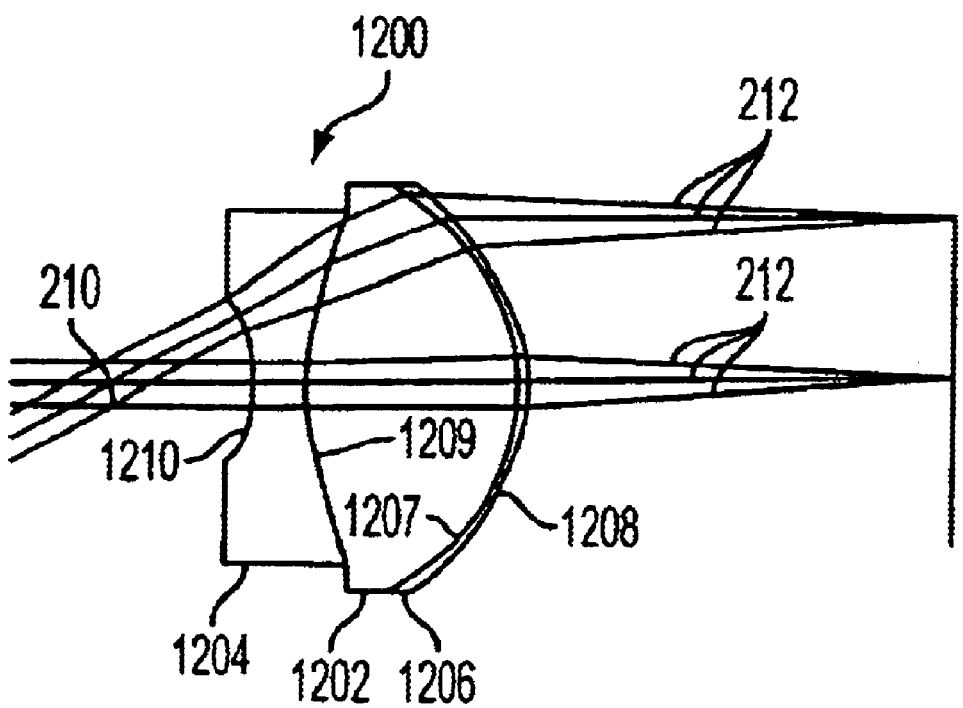
FIG. 12 is another lens unit according to the present invention.

FIG. 12 shows a lens unit 1200. Lens unit 1200 has two lens elements 1204 and 1202 and an aspheric cap 1208. First lens element 1204 is made out of acrylic. Second lens element 1202 is made out of LAH53. Aspheric cap 1208 is made out of acrylic. Lens unit 1200 has a first outside aspheric surface 1210 and a second outside aspheric surface 1208. Lens unit 1200 has a first inside surface 1209 and a second inside surface 1207. The first outside aspheric surface 1210 has a base radius of curvature of −62.2 mm. The second outside aspheric surface 1208 has a base radius of curvature of −64.0 mm. The first inside surface 1209 has a radius of curvature of 147 mm. The second inside surface 1207 has a radius of curvature of −64.0 mm.

Lens unit 1200 has an effective focal length of 100.0 mm, an F-number of 8.0, and a field-of-view of 60 degrees. The overall length of the holographic storage system from pupil location 210 to image plane 200 is 257 mm. The distance from the pupil location 210 to the vertex of the first outside aspheric surface 1210 is 44.0 mm. The thickness of the lens unit from the vertex of first outside aspheric surface 1210 to the vertex of first inside surface 1209 is 16.0 mm. The distance from the vertex of the first inside surface 1209 to the vertex of the second inside surface 1207 is 654 mm. The distance from the vertex of the second inside surface to the vertex of the second outside aspheric surface 1208 is 3.0 mm. The distance from the vertex of second outside aspheric surface 1208 to image plane 200 is 128.8 mm. The characteristics of lens unit 1200 are summarized in Table 11.

TABLE 11

Lens Unit 1200

Effective Focal Length (EFL) = 100.0 mm
Field of view 2ω = 60 deg
F-number: 8.0
Overall length: 257 mm (distance from pupil location to image plane)

| Position on FIG. 12 | Radius of curvature R (mm) | Central thickness/ airspace t* (mm) | Lens Material |
|---------------------|----------------------------|-------------------------------------|---------------|
| 210 | 0.0 | 44.0 (y = 1210, x = 1209) | |
| 1210 | −62.2** | 16.0 (y = 1209, x = 1210) | acrylic |
| 1209 | 147 | 65.4 (y = 1207, x = 1209) | LAH53 |
| 1207 | −72.0 | 3.0 (y = 1208, x = 1207) | acrylic |
| 1208 | −64.0** | 128.8 (y = 200, x = 1208) | |
| | 0.0 | | |

*t = distance between positions y and x, wherein x and y are positions in FIG. 12.
**The aspheric coefficients are:
Surface 1210: k = 3.5 a4 = −6.0e−7 a6 = −3.0e−9 a8 = 3.0e−12
Surface 1208: k = −1.2 a4 = −1.6e−7 a6 = −6.57e−11 a8 = 1.7e−14

EXAMPLE 12

Figure 13:
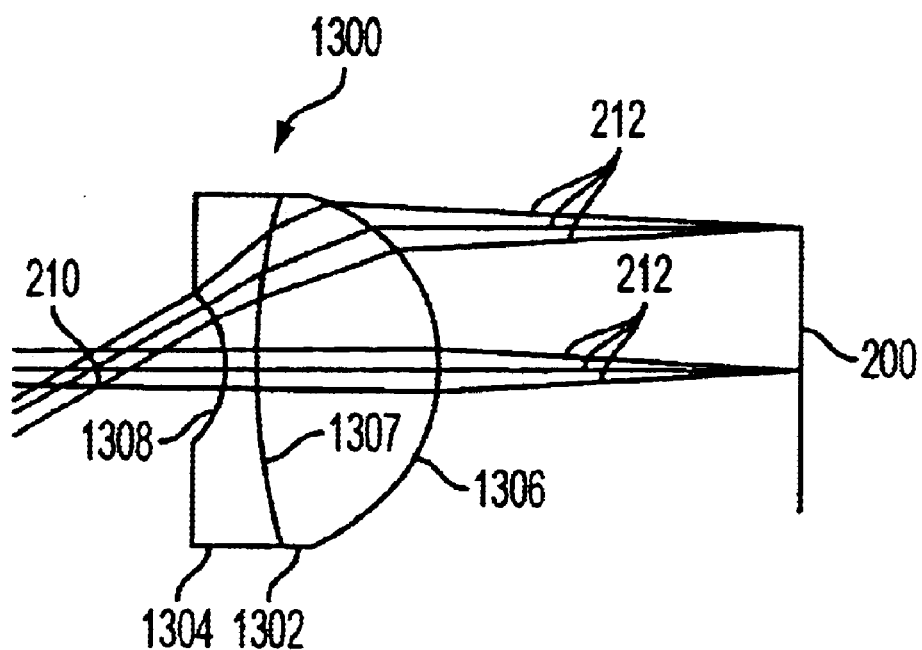
FIG. 13 is another lens unit according to the present invention.

FIG. 13 shows a lens unit 1300. Lens unit 1300 has two lens elements 1304 and 1302. The first lens element 1304 is made out of acrylic. The second lens element 1302 is made out of LAH53. Lens unit 1300 has a first outside aspheric surface 1308 and a second outside aspheric surface 1306. Lens unit 1300 has a first inside surface 1307. The first outside aspheric surface 1308 has a base radius of curvature of −62.0 mm. The second outside aspheric surface 1306 has a base radius of curvature of −63.1 mm. The first inside surface 1307 has a radius of curvature of 285.0 mm.

Lens unit 1300 has an effective focal length of 100.0 mm, an F-number of 8.0, and a field-of-view of 60 degrees. The overall length of the holographic storage system from pupil location 210 to image plane 200 is 254 mm. The distance from the pupil location 210 to the vertex of the first outside aspheric surface 1308 is 47.0 mm. The thickness of the lens unit from the vertex of first outside aspheric surface 1308 to the vertex of first inside surface 1307 is 12.0 mm. The distance from the vertex of the first inside surface 1307 to the vertex of the second outside aspheric surface 1306 is 64.6 mm. The distance from the vertex of second outside aspheric surface 1306 to image plane 200 is 130.9 mm. The characteristics of lens unit 1300 are summarized in Table 12.

TABLE 12

Lens Unit 1300

Effective Focal Length (EFL) = 100.0 mm
Field of view 2ω = 60 deg
F-number: 8.0
Overall length: 254 (distance from pupil location to image plane)

| Position on FIG. 13 | Radius of curvature R (mm) | Central thickness/ airspace t* (mm) | Lens Material |
|---------------------|----------------------------|-------------------------------------|---------------|
| 210 | 0.0 | 47.0 (y = 1308, x = 210) | |
| 1308 | −62.0** | 12.0 (y = 1307, x = 1308) | acrylic |
| 1307 | 285.0 | 64.6 (y = 1306, x = 1307) | LAH53 |
| 1306 | −63.1** | 130.9 (y = 200, x = 200) | |
| | 0.0 | | |

*t = distance between positions y and x, wherein x and y are positions in FIG. 13.
**The aspheric coefficients are:
Surface 1308: k = 3.7 a4 = −2.0e−6 a6 = 7.0e−10 a8 = −1.55e−12
Surface 1306: k = −0.9 a4 = −3.0e−7 a6 = −2.1e−11 a8 = −6.0e−15

FIG. 14 is a table that summarizes some of the important characteristics of the lenses shown in FIGS. 2–13. All of the characteristics are for lenses that have been scaled to have an effective focal length of 100 mm. All of the lenses are single-component lenses that have one or two lens elements. Lenses 6, 7 and 12 also have aspheric caps. The disclosed lenses have low Petzval sums and large pupil separation and object distances.

Having now fully described this invention, it will be appreciated by those skilled in the art that the invention can be performed within a wide range of parameters within what is claimed, without departing from the spirit and scope of the invention.

What is claimed is:

1. A holographic recording system comprising:
   an encoding device;
   a storage medium;
   a single-component lens placed between the encoding device and the storage medium, wherein the single-component lens directs a signal beam encoded by the encoding device onto a pupil plane positioned at the storage medium, and wherein the single-component lens has a pupil aberration that is less than 40% of the on axis pupil radius.

2. The holographic recording system of claim 1, wherein the encoding device is a spatial-light modulator.

3. The holographic recording system of claim 1, wherein the single-component lens has an axial thickness of between 50% of EFL and 110% of EFL.

4. The holographic recording system of claim 1, wherein the single-component lens comprises at least one material with a refractive index greater than 1.6.

5. The holographic recording system of claim 1, wherein the single-component lens comprises a first lens element and a second lens element.

6. The holographic recording system of claim 5, wherein the difference between the refractive index of the first lens element and the second lens element is at least 0.2.

7. The holographic recording system of claim 1, wherein the single-component lens has a pupil with a separation of 25% of EFL to about 80% of EFL.

8. The holographic recording system of claim 1, wherein the single-component lens has a Petzval sum less than 0.0030 mm$^{-1}$ when the single component lens is scaled to have an effective focal length of 100 mm.

9. The holographic recording system of claim 1, wherein the single-component lens has a field-of-view between 50 degrees and 75 degrees.

10. The holographic recording system of claim 1, wherein the single-component lens is telecentric.

11. The holographic recording system of claim 1, wherein the single-component lens has an object distance from 100% of EFL to 160% of EFL.

12. The holographic recording system of claim 1, wherein the single-component lens has a pupil separation of from 25% of EFL to 80% of EFL.

13. A holographic retrieval system comprising:
   a storage medium;
   a sensor;
   a single-component lens placed between the sensor and the storage medium, wherein the single-component lens focuses a signal beam emanating from the storage medium onto the sensor, and wherein the single-component lens has a pupil aberration that is less than 40% of the on axis pupil radius.

14. The holographic retrieval system of claim 13, wherein the single-component lens has an axial thickness of between 50% of EFL and 110% of EFL.

15. The holographic retrieval system of claim 13, wherein the single-component lens comprises at least one material with a refractive index greater than 1.6.

16. The holographic retrieval system of claim 13, wherein the single-component lens comprises a first lens element and a second lens element.

17. The holographic retrieval system of claim 13, wherein the difference between the refractive index of the first lens element and the second lens element is at least 0.2.

18. The holographic retrieval system of claim 13, wherein the single-component lens has a pupil with a separation of 25% EFL to about 80% EFL.

19. The holographic retrieval system of claim 13, wherein the single-component lens has a Petzval sum less than 0.0030 mm$^{-1}$ when the single component lens is scaled to have an effective focal length of 100 mm.

20. The holographic retrieval system of claim 13, wherein the single-component lens has a field-of-view between 50 degrees and 75 degrees.

21. The holographic retrieval system of claim 13, wherein the single-component lens is telecentric.

22. The holographic retrieval system of claim 13, wherein the single-component lens has an object distance from 100% of EFL to 160% of EFL.

23. The holographic retrieval system of claim 13, wherein the single-component lens has a pupil separation of from 25% of EFL to 80% of EFL.

* * * * *